A. C. WHIDDEN.
RESILIENT WHEEL.
APPLICATION FILED JULY 13, 1914.
1,111,281.  Patented Sept. 22, 1914.
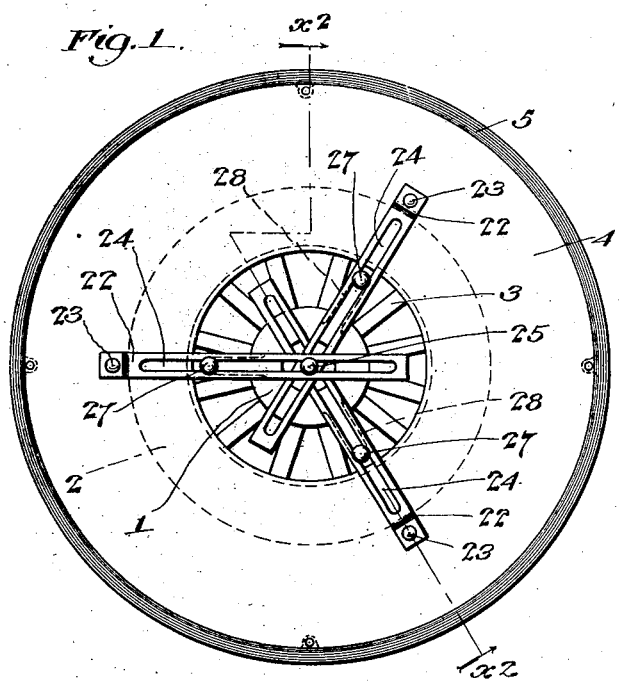
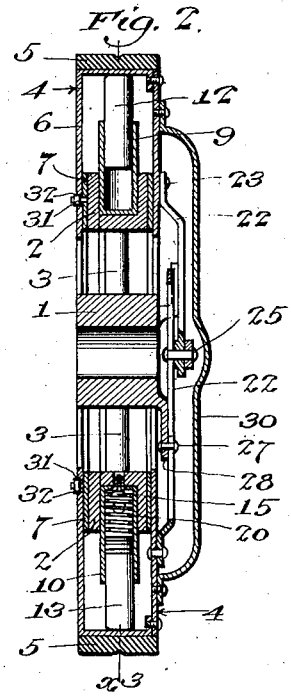
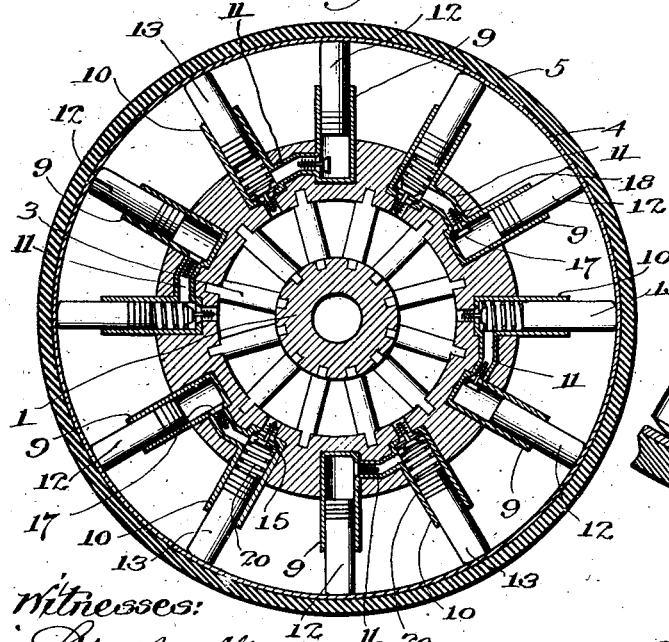
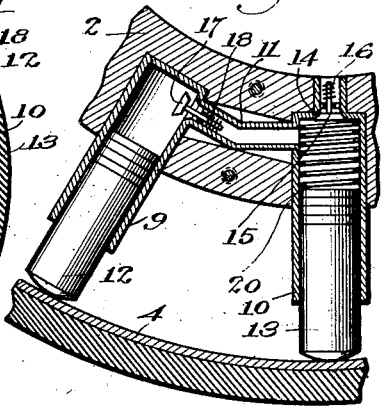
Inventor:
Austin C. Whidden

UNITED STATES PATENT OFFICE.

AUSTIN C. WHIDDEN, OF LANCASTER, CALIFORNIA.

RESILIENT WHEEL.

1,111,281.  Specification of Letters Patent.  Patented Sept. 22, 1914.

Original application filed October 13, 1913, Serial No. 794,860. Divided and this application filed July 13, 1914. Serial No. 850,536.

*To all whom it may concern:*

Be it known that I, AUSTIN C. WHIDDEN, a citizen of the United States, residing at Lancaster, in the county of Los Angeles and State of California, have invented a new and useful Resilient Wheel, of which the following is a specification.

This is a divisional application of my application, filed October 13th, 1913, Serial No. 794,860.

The invention relates to a wheel of the type having a hub and a rim which are adapted to move with relation to each other.

The object of the invention is to provide an improved connecting device for connecting the hub and the rim of a wheel of this type to cause the rim and the hub to move circumferentially together in all their relative positions.

The accompanying drawings illustrate an embodiment of my invention, and referring thereto:

Figure 1 is a side elevation of a wheel and my connecting device applied thereto. Fig. 2 is a section on line $x^2$—$x^2$ of Fig. 1. Fig. 3 is a section on line $x^3$—$x^3$ of Fig. 2. Fig. 4 is a fragmentary section, showing one of the pneumatic spring elements with its pump.

The wheel to which my improved connecting device is applied may be a pneumatic resilient wheel, as disclosed in my aforesaid application, which wheel comprises a hub 1, an inner rim 2 connected to said hub, for example, by spokes 3, an outer rim 4, and pneumatic resilient means interposed between said inner and outer rims. The outer rim 4 is provided with any suitable shoe or tread member 5, for example, of solid rubber, and is formed with annular side walls or flanges 6, adapted to embrace and slide on the inner rim 2. In case said inner rim 2 is formed of wood, it is provided with metal bearing plates 7 for sliding engagement with the flanges 6 of the outer rim. A series of pneumatic devices are disposed between the inner and the outer rim, each of said devices comprising a pneumatic spring cylinder 9, a pump cylinder 10 communicating with said pneumatic spring cylinder 9 by a passage or pipe 11 and plungers 12 and 13 working in the respective cylinders 9 and 10. The cylinders 9 and 10 are secured to the inner rim 2, and the plungers 12 and 13 engage at their outer ends with the inside face of the outer rim, and are preferably rounded convex at their outer ends to enable them to slide more readily on such face. The pump cylinder 10 is provided with an intake passage or port 14, having a check valve 15, normally closed by the spring 16, and an outlet valve 17 is provided in the passage 11, normally closed by the spring 18. Suitable means, such as a spring 20, is provided for holding the pump plungers 12 to outermost position.

The operation of the wheel, as a resilient wheel, is as follows: As each pump cylinder 10 is, by the revolution of the wheel, brought into the lower part of the wheel, if a load is on the wheel, the plunger 13 thereof is pushed into this cylinder 10 by engagement of said plunger with the outer rim 4, which is nearer to the inner rim at the lower portion of the wheel, owing to the load on the wheel. This movement of plunger 13 causes the air to be compresed in the pump cylinder, and, valve 17 being opened under this pressure, a certain amount of air is pressed into the pneumatic spring cylinder 9, communicating with said pump cylinder. The pump cylinder 10 for each pneumatic device is located somewhat in advance of the cylinder 9 of the corresponding device in the direction of rotation of the wheel, or said cylinders are otherwise so arranged that the maximum compression in each cylinder 10 is non-simultaneous with the maximum compression in the corresponding cylinder 9, so as to permit this pumping action. This operation being repeated at each revolution and taking place in each one of the pairs of pump and spring cylinders, compressed air is accumulated in each of the pneumatic cylinders, until the resiliency of such cylinders becomes sufficient to sustain the load. The valves may be so proportioned that, when the proper pressure is attained, the outlet valve 17 fails to open on the compression stroke, or the inlet valve 15 fails to open on the suction stroke, so that the accumulation of pressure is automatically limited. It will be seen that by providing a considerable number of pairs of cylinders, a sufficient number may always be presented at the lower part of the wheel to assure a continuous sustaining action in the revolution of the wheel. The outer rim 4 is provided with recesses 31 for holding grease, and said recesses are closed by screw plugs 32. A cover 30 is secured on the outer rim and extends over the bars 22.

In order to cause the inner and the outer rims to rotate together, I use connections, shown in Figs. 1 and 2, the bars 22 being pivoted at 23 on the outer rim and extending inwardly past the center of the wheel, said bars crossing and overlapping one another and being longitudinally slotted, as at 24, to receive a pivot pin 25, which passes through the slots 24 of all of said bars and forms a floating pivot for connecting all of the bars at the center of the wheel. Pins 27, connected to the hub 1, for example, by a spider 28, engage in the respective slots 24 of the several bars 22, so as to force the said bars and the outer rim to rotate with the hub when the latter is rotated, or vice versa. In case, however, there is any lateral movement of the inner rim and hub, the slotted arms or bars 22 will allow such movement by turning on their pivots and by slipping on the several pins 27. Thus, in case the hub moves downward from the position shown in Fig. 1, the horizontally extending bar 22 will swing downwardly on its pivot, and the pivot pin 25 will ride downwardly in the respective slots 24 of the other two bars 22, the upper bar swinging downward and to the right, and the lower bar swinging downward and to the left in this operation.

What I claim, is:

A resilient wheel comprising outer and inner rim members, resilient connections therebetween for resiliently sustaining said inner from said outer member, bars pivotally mounted on said outer member overlapping one another, said bars being longitudinally slotted, a floating pivot engaging in the slots of all said bars, and pins connected to the inner member and having a sliding engagement with the respective bars to provide a rotative connection between said members while allowing lateral movement thereof.

In testimony whereof, I have hereunto set my hand at Lancaster, California, this 6th day of July 1914.

AUSTIN C. WHIDDEN.

In presence of—
ALBERT M. HULL,
HUGH PETRIE.